United States Patent [19]

Martini

[11] 4,391,474
[45] Jul. 5, 1983

[54] THRUST SHAFT SEAL WITH SLIDABLY MOUNTED BEARING SLEEVE

[76] Inventor: Leonard J. Martini, 2801 Ocean Front Walk, F, San Diego, Calif. 92109

[21] Appl. No.: 238,334

[22] Filed: Feb. 26, 1981

[51] Int. Cl.³ .................. F16J 15/26; F16J 15/56; F16C 33/74
[52] U.S. Cl. ............................ 384/152; 114/23; 277/65; 277/83; 277/176
[58] Field of Search ............ 308/36.1, 187.1, 187.2; 114/23, 24; 277/58, 65, 73, 32, 92, 12, 93 R, 83, 173, 177, 176

[56] References Cited

U.S. PATENT DOCUMENTS

| | | | |
|---|---|---|---|
| 1,668,976 | 5/1928 | Peet et al. | 308/36.1 |
| 2,648,554 | 8/1953 | Gilbert | 277/58 X |
| 2,694,453 | 11/1954 | Longeval et al. | 277/73 |
| 2,851,982 | 9/1958 | Fogarty | 114/23 |
| 2,950,931 | 8/1960 | Englesson | 277/65 X |
| 3,101,200 | 8/1963 | Tracy | 277/93 |
| 3,420,535 | 1/1969 | Hershey | 277/92 |
| 3,608,509 | 9/1971 | Brooks et al. | 114/23 |
| 3,765,689 | 10/1973 | Adams | 277/26 |
| 4,007,940 | 2/1977 | Chapa | 277/32 |
| 4,114,899 | 9/1978 | Kulzer et al. | 277/22 |
| 4,155,559 | 5/1979 | Sieghartner | 277/93 R |

Primary Examiner—Robert S. Ward, Jr.

[57] ABSTRACT

A seal for a thrust shaft in a body wherein the body has a bore and a counterbore, the bottom of the counterbore providing a shoulder for the thrust force of the shaft. The seal includes a bearing sleeve which is slidably mounted on the shaft, the bearing sleeve having a static O-ring which seals the interior of the sleeve to the shaft and a flange which extends into the counterbore. Provision is made for radially fixing the bearing sleeve to the shaft. A ring-shaped seal housing is mounted about the shaft below the bearing sleeve and extends into the counterbore, the seal housing having an interior dynamic O-ring sealing the housing to the shaft and an exterior static O-ring which seals the housing to the counterbore.

8 Claims, 4 Drawing Figures

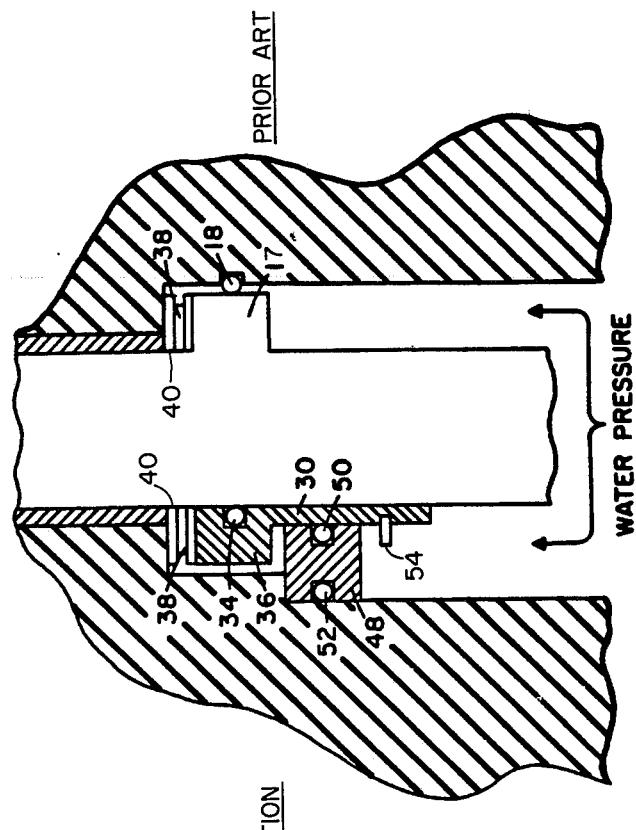
FIG. 4 PRIOR ART
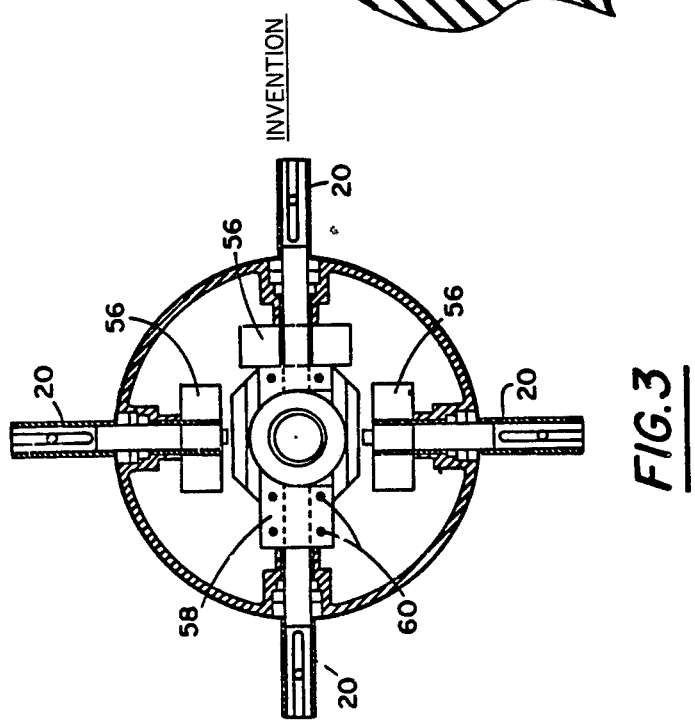
FIG. 3 INVENTION 4,391,474

THRUST SHAFT SEAL WITH SLIDABLY MOUNTED BEARING SLEEVE

STATEMET OF GOVERNMENT INTEREST

The invention described herein may be manufactured and used by or for the Government of the United States of America for governmental purposes without the payment of any royalties thereon or therefor.

BACKGROUND OF THE INVENTION

The prior art thrust shaft seal arrangement necessitated the shaft having an annular flange which bottomed out in a counterbore of a body for transferring the thrust load of the shaft. In this arrangement the body has an annular groove with an O-ring for sealing the flange of the shaft to the body. The U.S. Navy has had a particular problem with this type of thrust shaft seal where seawater pressure is subjected to the seal on the counterbore side thereof. With wear of the O-ring a slight amount of seawater would enter the groove in the body and corrode the groove so that it would become inoperable to provide the required seal. When this happens a very expensive body portion of an underwater vehicle must be discarded or reworked by an expensive process to bring it back into service.

SUMMARY OF THE INVENTION

The present invention provides a thrust shaft seal wherein the body supporting the shaft is not ruined by corrosion when seawater penetrates the groove supporting the dynamic O-ring thereof. This has been accomplished by an arrangement which eliminates the integral flange found on the prior art thrust shafts. In the present invention a bearing sleeve is slidably mounted on the shaft wherein the bearing sleeve has a static O-ring which seals the interior of the sleeve to the shaft and a flange which extends into the counterbore. Provision is made for radially fixing the bearing sleeve to the shaft. A ring-shaped seal housing is mounted about the shaft below the bearing sleeve and extends into the counterbore, the seal housing an interior dynamic O-ring sealing the housing to the shaft and an exterior static O-ring which seals the housing to the counterbore. With this arrangement corrosion of the groove supporting the dynamic O-ring does not in any way affect the body which supports the thrust shaft.

By serendipity several other surprising advantages are obtained by the present invention. Because of the arrangement of the present invention the dynamic O-ring thereof can be made much smaller in diameter over the prior art dynamic O-ring resulting in: (1) less thrust load on the shaft when the shaft is subjected to increasing water depth pressures and (2) less frictional torque load at the dynamic O-ring resulting in less power required to turn the thrust shaft by a power unit.

OBJECTS OF THE INVENTION

An object of the invention is to overcome the aforementioned problems associated with prior art thrust shaft seals.

Another object is to prevent corrosion from ruining a body which sealably supports a thrust shaft in a salt water environment.

A further object is to lessen the frictional torque load at a dynamic O-ring between a thrust shaft and a body.

Still another object is to reduce thrust load on a thrust shaft sealed in a body due to water depth pressure from one end of the thrust shaft.

Yet another object is to prevent corrosion from ruining a body which sealably supports a thrust shaft in a salt water environment, lessen the frictional torque load on the dynamic O-ring, and reduce thrust load on the shaft due to water depth pressure from one end of the thrust shaft.

Still a further object is to eliminate any integral flange on a thrust shaft and any O-ring grooves in the body supporting the shaft.

Other objects, advantages and novel features of the invention will become apparent from the following detailed description of the invention when considered in conjunction with the accompanying drawings.

DESCRIPTION OF THE DRAWINGS

FIG. 3 is a view taken along plane III—III of FIG. 2.

FIG. 4 is a longitudinal view of thrust shaft seals with the prior art arrangement shown on the right side and the present invention shown on the left side thereof for comparison purposes.

DESCRIPTION OF THE PREFERRED EMBODIMENT

Figure 1:
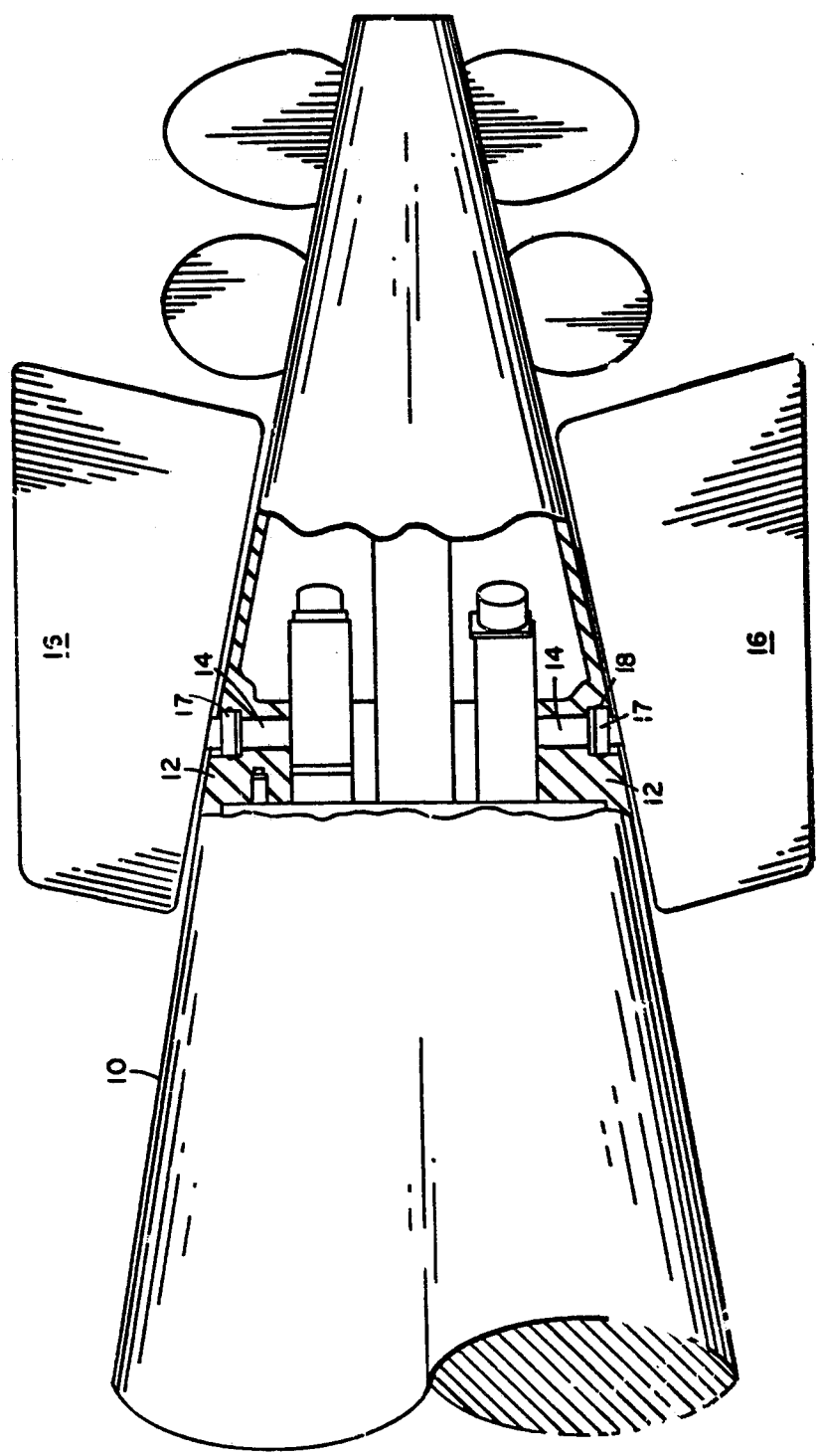
FIG. 1 is a side view of a torpedo with a portion cut away to illustrate a top and bottom prior art thrust shaft seal wherein the shaft has an integral flange and the body has a dynamic O-ring groove.

Referring now to the drawings wherein like reference numerals designate like or similar parts throughout the several views there is illustrated in FIG. 1 a torpedo 10 which has body portions 12 for supporting top and bottom thrust shafts 14. These shafts operate top and bottom fins 16, and another pair of shafts operate lateral fins which are not shown. Each thrust shaft has an integral flange 17 which is sealed in a counterbore of the torpedo body by an O-ring 18, the O-ring being disposed within a groove within the torpedo body. The problem with this prior art arrangement is that failure of the dynamic O-ring seal results in corrosion of the O-ring groove in the torpedo body. This means that the torpedo body must be discarded or repaired by costly procedures.

Figure 2:
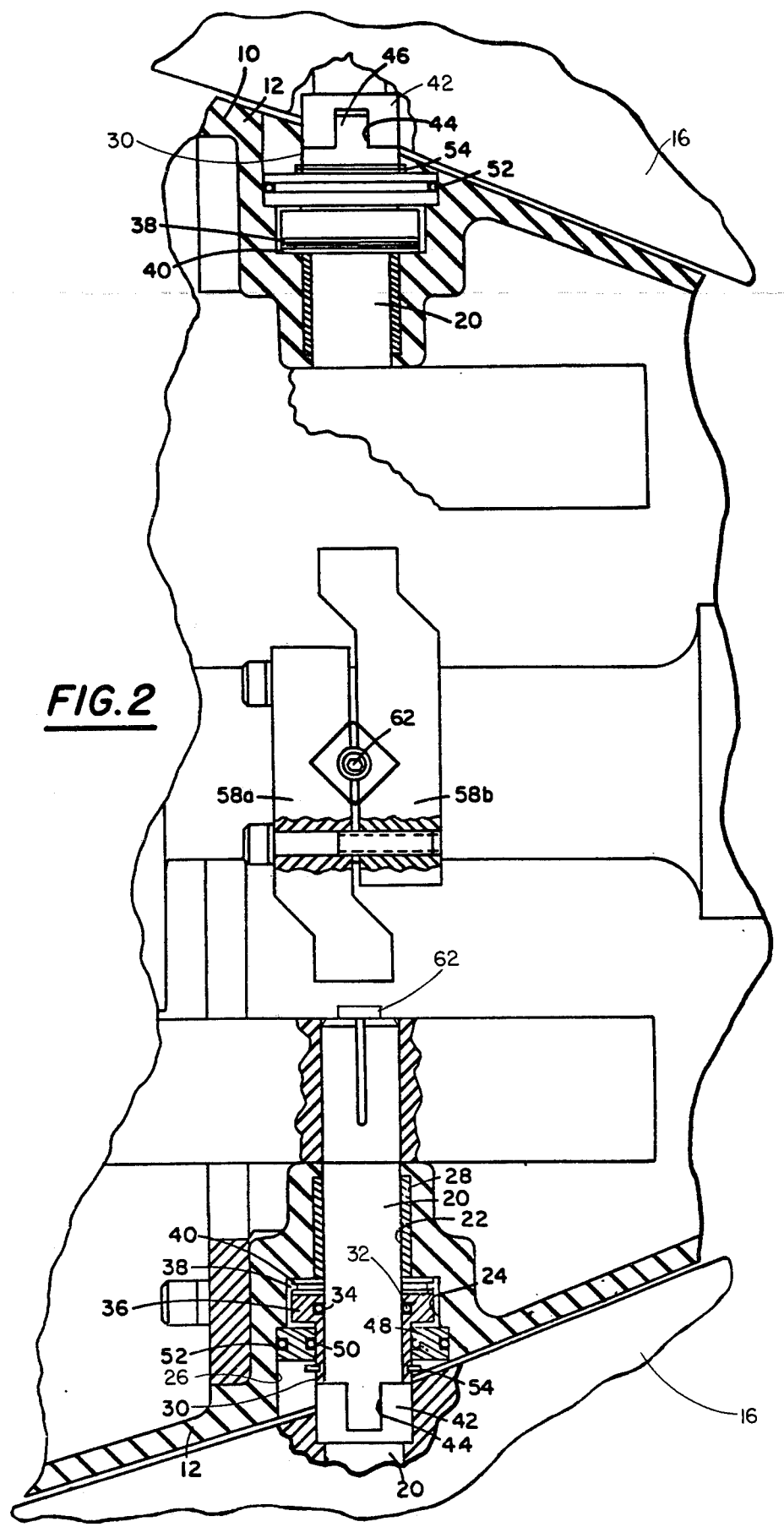
FIG. 2 is a side view of a torpedo with a portion cut away to illustrate top and bottom shaft seals of the present invention wherein each shaft does not have an integral flange and each body portion supporting the shaft does not have a dynamic O-ring groove.

The present invention, which overcomes the problems associated with the prior art thrust shaft seal arrangement, is illustrated in FIGS. 2 and 3. As illustrated in FIG. 2 there are shown top and bottom thrust shafts 20. Lateral thrust shafts are also provided, both of which can be seen in FIG. 3 and the end of one of these shafts being shown in FIG. 2. Each of these shafts are connected at an exterior end to a respective fin 16 by any suitable means, such as force fit, for controlling the movements of the torpedo. As will be explained in more detail hereinafter the lateral fins are moved in a dependent manner and the top and bottom fins are moved in an independent manner.

The body portions of the torpedo 12 which support the thrust shafts 20 are each provided with a bore 22 and a counterbore 24. The counterbore 24 may be further provided with a secondary counterbore 26 for purpose to be explained in more detail hereinafter. Each bore 22 may be provided with bronze sleeve 28 for slidably receiving each respective thrust shaft 20.

The invention includes a bearing sleeve 30 which is slidably mounted on each shaft 20. The bearing sleeve has an interior O-ring groove 32 with a dynamic O-ring 34 therein for sealing the interior of the sleeve to the thrust shaft. Further, the bearing sleeve is provided with an annular flange 36 which extends into the counterbore 24 and bottoms out therein in engagement with a thrust bearing 38 for receiving thrust loads on the shaft 20 due to exterior water depth pressure. If desired a thrust washer 40 may be provided between the thrust bearing 38 and the bottom of the counterbore 24.

The present invention further includes means for radially fixing each bearing sleeve 30 to the respective thrust shaft 20. As illustrated in the bottom thrust shaft seal arrangement of FIG. 2 the thrust shaft 20 may be provided with an enlarged diameter collar portion 42 which has a cutout 44. As illustrated in the top thrust shaft seal arrangement of FIG. 2 the radially fixing means may further include the bearing sleeve 30 having a tab 46 which is longitudinally received within the cutout 44 of the thrust shaft. This engagement between the bearing sleeve tab 46 and the thrust shaft cutout 44 radially fixes the bearing sleeve 30 in the respective thrust shaft 20. It should be noted that with this arrangement each O-ring 34 between the bearing sleeve and the thrust shaft remains in a static condition as the thrust shaft 20 is rotated.

The invention further provides a ring-shaped seal housing 48 which is mounted about the bearing sleeve 30 and which extends into the secondary counterbore 26. The seal housing 48 has an interior O-ring groove with a dynamic O-ring 50 for sealing the housing 48 to the bearing sleeve 30, and further has an exterior O-ring groove with a static O-ring 52 for sealing the housing to the secondary counterbore 26. If desired a retainer ring 54 may be mounted in the exterior of the bearing sleeve 30 below the ring-shaped seal 48 for maintaining the ring-shaped seal in position during movements of the torpedo. The secondary counterbore 26 is provided so that the static O-ring 52 will have an increased diameter. This is a very important feature since the increased diameter of the O-ring 52 automatically maintains it in a static condition because of the increased friction of this O ring over the interior O-ring 50. Since the outside O-ring 52 is sizeably larger than the interior O-ring 50 the outer O-ring 52 is assured of being a static O-ring and the interior O-ring 50 is assured of being a dynamic O-ring. This particular arrangement, whether the secondary counterbore 26 is provided or not, is right at the essence of the present invention.

As illustrated in FIGS. 2 and 3 the interior end of each top and bottom thrust shaft may be mounted within a respective motor 56 for turning the top and bottom fins independently of one another. The interior ends of the lateral thrust shafts 20 may be operated in a dependent fashion by a motor 56 and a yoke arrangement 58. As illustrated in FIG. 2 the yoke may be provided in two parts 58a and 58b which, as illustrated in FIG. 3, are clasped about the interior end of each lateral thrust shaft and secured in place by bolts 60. As illustrated in FIG. 3 the motor 56 may be mounted in an intermediate fashion on the right thrust shaft 20 so that when the motor 56 is operated both lateral shafts will rotate together because of the yoke assembly 58. As illustrated in FIG. 2, all of the thrust shafts may be bifurcated and internally threaded at their interior end so that a tapered screw 62 can be utilized for expanding the bifurcations to make a tight engagement with the motors 56.

FIG. 4 illustrates dramatically the differences between the prior art thrust shaft seal and the present invention. As shown on the right hand side of FIG. 4 the prior art thrust shaft seal necessitated the thrust shaft having an annular flange 17 and the body having an O-ring groove with a dynamic O-ring 18. Upon deterioration of the dynamic O-ring 18 water can intrude into the O-ring groove and corrode the body resulting in destruction or costly repairs. The invention is illustrated on the left side of FIG. 4 wherein the thrust shaft is no longer required to have an annular flange for carrying the thrust load on the thrust bearing 38. In contrast, the flange 36 of the bearing sleeve 30 provides this function. This eliminates the requirement of an O-ring groove in the body and overcomes the problem of corrosion thereof. Further, a surprising result is that the O-ring 50, which is the only dynamic O-ring in the present invention, is significantly smaller in diameter than the O-ring 18 in the prior art arrangement. First, this means that the thrust load due to water pressure will be less, thereby resulting in less load on the thrust bearing 38. Further, the smaller diameter O-ring 50 results in less frictional torque load during rotational movements of the thrust shaft which results in less load on the motors 56. In an actual comparison of the present invention with the prior art it was found that the shaft size could be increased by 25% and at the same time the frictional torque load could be decreased by 20% over the prior art.

Obviously many modifications and variations of the present invention are possible in the light of the above teachings. It is therefore to be understood that within the scope of the appended claims the invention may be practiced otherwise than as specifically described.

What is claimed is:

1. A seal for a thrust shaft in a body wherein the body has a bore and a counterbore, comprising:
   a bearing sleeve slidably mounted on the shaft, said bearing sleeve having a static O-ring which seals the interior of the sleeve to the shaft and a flange which extends into the counterbore;
   means radially fixing the bearing sleeve to the shaft;
   a ring-shaped seal housing mounted about the bearing sleeve and extending into the counterbore, said seal housing having an interior dynamic O-ring sealing the housing to the bearing sleeve and an exterior static O-ring sealing the housing to the counterbore.

2. A seal as claimed in claim 1 including:
   a retainer ring mounted about the exterior of the bearing sleeve below the ring-shaped seal.

3. A seal as claimed in claim 1 including:
   said body having a second counterbore within the first mentioned counterbore; and
   the ring-shaped seal housing being mounted in the second counterbore.

4. A seal as claimed in claim 1 wherein the means radially fixing the bearing sleeve to the shaft includes:
   the bearing sleeve having a tab; and
   the shaft having a collar with a cutout for receiving the tab.

5. A seal as claimed in claim 1 including:
   a thrust bearing mounted in the counterbore between the bottom of the counterbore and the sleeve flange for taking the thrust load transferred by the shaft through the sleeve flange.
6. A seal as claimed in claim 5 including:
a retainer ring mounted in the exterior of the bearing sleeve below the ring-shaped seal.
7. A seal as claimed in claim 6 including:
said body having a second counterbore within the first mentioned counterbore; and
the ring-shaped seal housing being mounted in the second counterbore.
8. A seal as claimed in claim 7 wherein the means radially fixing the bearing sleeve to the shaft includes:
the bearing sleeve having a tab; and
the shaft having a collar with a cutout for receiving the tab.

* * * * *